US 6,636,657 B1

(12) United States Patent
Aksyuk et al.

(10) Patent No.: US 6,636,657 B1
(45) Date of Patent: Oct. 21, 2003

(54) CHANNELIZED WAVELENGTH DIVISION MULTIPLEX EQUALIZER USING REFLECTIVE ATTENUATORS

(75) Inventors: Vladimir Anatolyevich Aksyuk, Piscataway, NJ (US); John David Bishop, Summit, NJ (US); Randy Clinton Giles, Whippany, NJ (US); Rene R. Ruel, Bridgewater, NJ (US)

(73) Assignee: Lucent Technolgies Inc., Murray Hill, NJ (US)

( * ) Notice: Subject to any disclaimer, the term of this patent is extended or adjusted under 35 U.S.C. 154(b) by 0 days.

(21) Appl. No.: 09/349,261

(22) Filed: Jul. 7, 1999

(51) Int. Cl.[7] .............................. G02B 6/28; G02B 6/26; G02B 6/42; G02B 26/00; H04J 14/02
(52) U.S. Cl. .......................... 385/24; 359/127; 385/31; 385/47; 385/52; 385/140
(58) Field of Search .............................. 385/16–20, 47, 385/24, 31, 39, 52, 140; 359/127, 291, 223, 153, 121, 164; 370/479, 535

(56) References Cited

U.S. PATENT DOCUMENTS

| | | | | |
|---|---|---|---|---|
| 5,714,773 A | * | 2/1998 | Burrows et al. | 257/82 |
| 5,841,917 A | * | 11/1998 | Jungerman et al. | 385/17 |
| 5,859,719 A | * | 1/1999 | Dentai et al. | 359/171 |
| 5,959,516 A | * | 9/1999 | Chang et al. | 334/14 |
| 6,058,229 A | * | 5/2000 | Burrows et al. | 385/24 |
| 6,128,133 A | * | 10/2000 | Bergmann | 359/487 |
| 6,144,781 A | * | 11/2000 | Goldstein et al. | 385/18 |
| 6,148,124 A | * | 11/2000 | Aksyuk et al. | 385/24 |
| 6,173,105 B1 | * | 1/2001 | Aksyuk et al. | 385/140 |
| 6,175,320 B1 | * | 1/2001 | Heflinger | 341/137 |
| 6,175,443 B1 | * | 1/2001 | Aksyuk et al. | 359/291 |
| 6,178,284 B1 | * | 1/2001 | Bergmann et al. | 385/140 |
| 6,232,847 B1 | * | 5/2001 | Marcy, 5th et al. | 331/167 |
| 6,236,481 B1 | * | 5/2001 | Laor | 359/124 |
| 6,242,989 B1 | * | 6/2001 | Barber et al. | 331/177 |
| 6,263,123 B1 | * | 7/2001 | Bishop et al. | 385/15 |
| 6,269,201 B1 | * | 7/2001 | Ko et al. | 385/22 |
| 6,289,145 B1 | * | 9/2001 | Solgaard et al. | 385/17 |
| 6,301,031 B2 | * | 10/2001 | Li | 359/124 |
| 6,304,709 B1 | * | 10/2001 | Fujita | 385/140 |
| 6,339,495 B1 | * | 1/2002 | Cowle et al. | 359/341.4 |
| 6,390,689 B1 | * | 5/2002 | Azimi et al. | 385/88 |
| 6,445,841 B1 | * | 9/2002 | Gloeckner et al. | 385/17 |

* cited by examiner

Primary Examiner—Frank G. Font
Assistant Examiner—Michael P. Mooney

(57) ABSTRACT

A channelized Wavelength Division Multiplex (WDM) equalizer enables the gain of each WDM channel to be individually controlled, enabling power adjustments of each channel over the equalizer's entire dynamic range. The gain equalizer includes a demultiplexer with each of its outputs interfaced to a different microelectromechanical system (MEMS) reflective device which adjusts optical power in response to a received control signal. The equalizer can be implemented to operate in a reflective mode or in a transmission mode.

11 Claims, 6 Drawing Sheets

Equalizer Spectra

Equalizer Spectra

US 6,636,657 B1

CHANNELIZED WAVELENGTH DIVISION MULTIPLEX EQUALIZER USING REFLECTIVE ATTENUATORS

TECHNICAL FIELD OF THE INVENTION

This invention relates to Wavelength Division Multiplex (WDM) equalizers and, more particularly, to a method of and apparatus for implementing a channelized WDM equalizer using microelectromechanical system (MEMS) devices.

BACKGROUND OF THE INVENTION

Wavelength Division Multiplex (WDM) lightwave systems are the primary means of transporting telephony and data signals over long distances. Optical signals in these systems may traverse hundreds or thousands of kilometers, passing through optical amplifiers and network nodes. Wavelength-dependent amplifier gain, fiber transmission loss and optical circuit losses may result in variation or fluctuation of the signal spectrum causing degradation of weaker or more-distorted channels. Erbium-doped fiber amplifier gain spectra can be flattened using fixed filters, gain-tilt regulating optical attenuators, or by other dynamic means [1]. (Note, the numbers in brackets refers to a reference listed in the Appendix.) Recently, gain equalizers using microelectromechanical system (MEMS) variable reflectors in free-space optics have been described [2,3].

What is desired is a variable gain channelized equalizer which can be implemented using guided wave optic system components.

SUMMARY OF THE INVENTION

In accordance with the present invention, we disclose a channelized Wavelength Division Multiplex (WDM) equalizer where the gain of each WDM channel is individually controlled, enabling power adjustments of each channel over the equalizer's entire dynamic range. The gain equalizer includes a demultiplexer with each of its outputs interfaced to a different microelectromechanical system (MEMS) reflective device which adjusts the optical power level being coupled to an optical apparatus in response to a received control signal. The channelized response enables equalization of signals that originate from diverse optical paths, either in the network or through optical multiplexers/demultiplexers, and which coalesce to a common path.

More particularly, in accordance with our invention, a wavelength division multiplex (WDM) signal equalizer comprises (1) a WDM signal guided-wave demultiplexer apparatus for receiving a WDM optical signal and demultiplexing it into a plurality of optical signal channels for output at different output ports of the demultiplexer apparatus and (2) a plurality of independently controllable microelectromechanical system (MEMS) devices, each MEMS device aligned with a different optical channel output port of the demultiplexer apparatus for adjustably controlling a signal level coupled from that optical channel output port of the WDM multiplexer apparatus to an optical apparatus in response to a control signal received at that MEMS device.

In a reflective equalizer embodiment, the signal being coupled is a reflection of the optical signal by each MEMS device back to the originating optical channel output port and the multiplexer apparatus receives the reflected adjusted optical signals and combines them into an equalized WDM signal. Another embodiment includes a circulator having an input port for receiving the input WDM optical signal, an output port for outputting the equalized WDM signal, and a third port for coupling the input WDM optical signals to and coupling the equalized WDM signal from the demultiplexer apparatus.

In a transmission equalizer embodiment, each MEMS device adjusts the coupling of the optical signal to a WDM multiplexer apparatus which receives the adjusted optical signals at a plurality of input ports and which multiplexes the adjusted optical signals together into an equalized WDM signal.

According to other features, guided-wave optical paths or optical fibers may be used to interface the demultiplexer and multiplexer to the MEMS devices. The guidedwave optical paths may be formed as part of the demultiplexer and multiplexer circuit integration. In another feature, the demultiplexer, multiplexer, optical paths, and MEMS devices may be integrated together on the same substrate.

BRIEF DESCRIPTION OF THE DRAWINGS

In the drawings.

In the following description, identical element designations in different figures represent identical elements. Additionally in the element designations, the first digit refers to the figure in which that element is first located (e.g., 105 is first located in FIG. 1).

DETAILED DESCRIPTION

Figure 1:
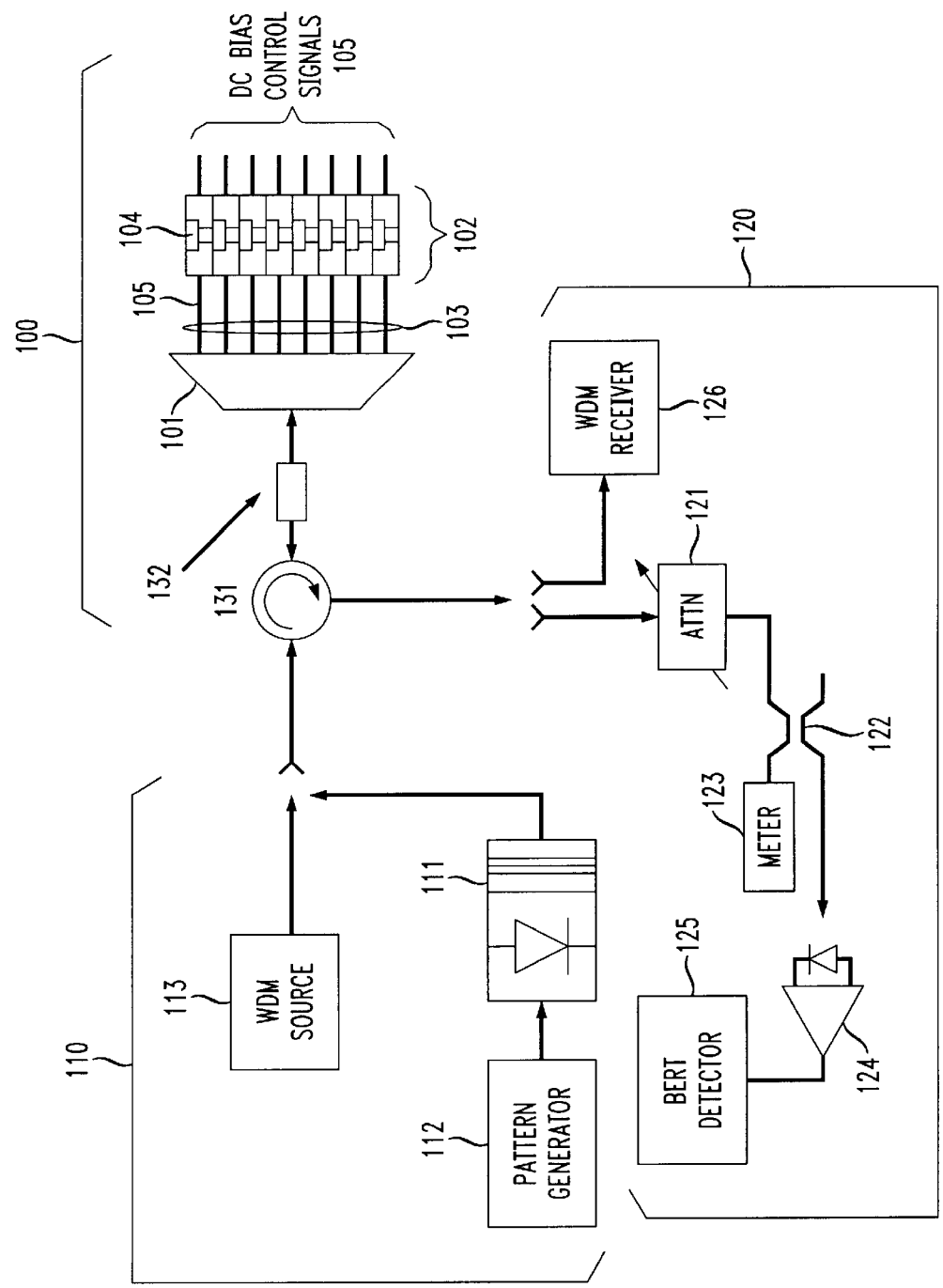
FIG. 1 shows, in accordance with the present invention, an illustrative block diagram of a first arrangement of our channelized Wavelength Division Multiplex (WDM) gain equalizer implemented using an 8-channel demultiplexer with each of its eight outputs connected to a reflective device of microelectromechanical system (MEMS). This figure also shows an illustrative test arrangement for the equalizer.

Shown in FIG. 1 is an illustrative block diagram of a first arrangement of our channelized Wavelength Division Multiplex (WDM) gain equalizer 100 where the coupled power level of each WDM channel is individually controlled, enabling power adjustments of each channel over the equalizer's entire dynamic range. The gain equalizer 100 includes a three-port optical circulator 131, an 8-channel guided-wave demultiplexer 101 with each of its eight outputs interfaced to a different reflective device of microelectromechanical system (MEMS) 102. In one particular FIG. 1 embodiment, a 1550 nm-wavelength gain equalizer 100 uses an 8-channel 200-GHz spaced arrayed waveguide grating router (7–8 dB one-pass insertion loss) 101 and optical fibers 103 to connect to the MEMS reflective attenuators 102. The MEMS reflective attenuators 102 may be individual devices or may be formed together on an integrated array. The gain equalizer 100 has a channelized response, that is the WDM channels' power level being reflected back by MEMS devices 102 to demultiplexer 101 are individually by control signals 105. Channelized signal adjustment is needed where signals originating from diverse optical paths, either in a network or through optical multiplexers/demultiplexers, coalesce to a common path. While one demultiplexer 101 is shown in FIG. 1 to perform both the demultiplexing of the input signal into separate channel signals and the multiplexing of the reflected channel signals, obviously a separate demultiplexer and multiplexer devices could be utilized.

Illustratively, the transmitter location 110 includes a WDM signal source 113. In an actual WDM system application, WDM signal source 113 would represent the different signal channels originating from diverse optical paths, each signal channel having a different power level. At receiver location 120 a WDM signal receiver 126 receives the equalized signals.

Figure 2:
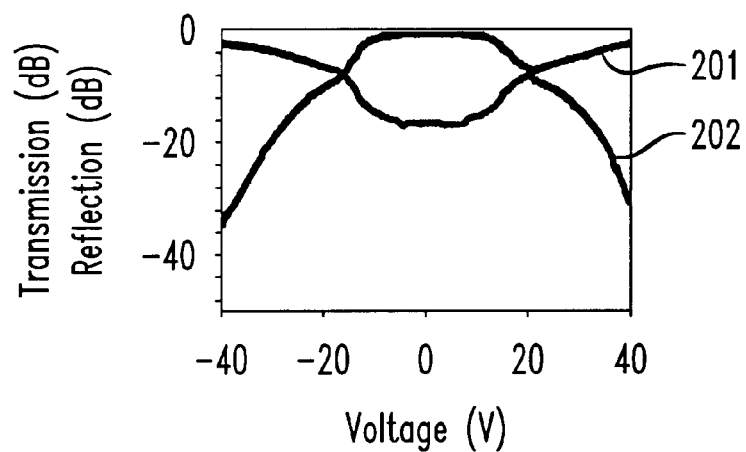
FIG. 2 shows illustrative attenuation characteristics of the reflection equalizer of FIG. 1 and the transmission equalizer of FIG. 4 as a function of the applied DC voltage.

The transmitter location 110 and receiver location 120 are also shown to include test apparatus. This test apparatus is used to measure the performance of the gain equalizer, the results of which are shown in FIGS. 2, 5, and 6. The transmitter location 110 test apparatus includes a laser transmitter 111 and a pattern generator 112 as a test data source. The receiver location 120 test apparatus includes a variable attenuator 121, coupler 122, power meter 123, and an analog photo detector (APD) receiver 124, and a bit error rate (BERT) detector 125.

The signal from WDM source 102 (or test apparatus) connects to an input port (IN) of a circulator 131 and the output port (OUT) of the circulator connects to the WDM receiver 126. The third port of the circulator connects the input port signal through a connector or fusion splice 132 to the input of equalizer 100. In a WDM system application a WDM signal is received at the input to circulator 131 and is demultiplexed by demultiplexer 101 and each demultiplexed signal is connected over a guided-wave optical path 103 to a separate reflective attenuator device, e.g., 104, of MEMS 102. The guided-wave optical path 103 interconnection between demultiplexer 101 and 102 may be implemented using an optical fibers. In another embodiment, the guided-wave optical paths 103 can be formed as part of the demultiplexer 101 circuit integration. In another embodiment, the demultiplexer 101, optical paths 103, and MEMS 102 may be integrated together on the same substrate.

Each of the demultiplexed signals from demultiplexer 101 is individually reflected by a reflective attenuator device of MEMS 102. The reflected signals are then recombined again in demultiplexer 101, enter the circulator 131 and exit through the output port of circulator 131. In accordance with the present invention, the amount of reflection provided by each reflective attenuator device, e.g., 104, to an optical signal radiated from optical fiber, e.g., 105, is controlled by a DC electrical control signal 105 applied to each reflective MEMS device, e.g., 104. With reference to FIG. 2 there is shown an illustrative reflection characteristic 201 of a reflective MEMS device 104 as a function of the applied DC voltage. As shown, at zero volts the reflection attenuation is about –18 dB and the reflection attenuation decreases symmetrically with an increase in either a positive or a negative DC voltage applied to the reflective MEMS device 104. The minimum reflection attenuation is about –3.6 dB at a bias of plus or minus 40 volts DC. Since the reflective attenuation decreases in a continuous manner as the absolute value of the DC voltage applied to the reflective attenuator device is increased, the attenuation at a particular reflective attenuator device, e.g., 104, can be set to any attenuation value in the range –16 dB to –3.5 dB by applying the appropriate DC voltage to that particular reflective MEMS device. In this manner, each individual signal channel of the WDM signal can be equalized independently of the equalization of adjacent or other WDM signal channels.

Figure 3:
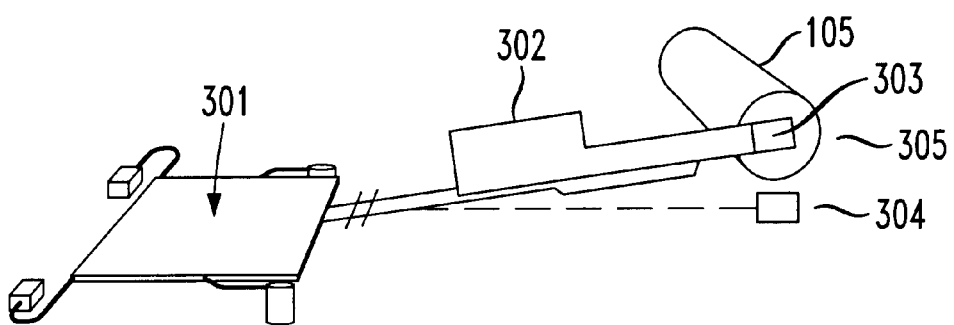
FIG. 3 shows a MEMS attenuator device consisting of a gold-coated silicon vane placed at the end of an optical fiber and is raised through a lever action by a spring-suspended, voltage-controlled capacitor actuator.

With reference to FIG. 3, there is shown an illustrative reflective MEMS device. As shown, the device includes spring-suspended capacitor activator 301 which has an arm or vane 302 onto which is mounted a gold mirror reflector 303. Gold is just illustrative of many materials (e.g., aluminum) which may be used as the mirror reflector 303. that The reflective MEMS device is similar to the device described in reference [4], which is incorporated by reference herein. The gold mirror reflector 303 on vane 302 is raised through a lever action by a spring-suspended, voltage-controlled capacitor actuator 301 in response to an applied DC voltage. With no applied DC voltage, the vane 302 of the spring-suspended capacitor activator would be in its inactivated position 304. In this inactivated position 304 the gold reflector 303 is arranged so as to not reflect (or to minimize the reflection) of any optical signal emerging from optical fiber 105. With reference to FIG. 2, in this inactivated position 304, zero volts, the reflection 201 is shown to be about –18 dB.

In response to an applied DC voltage to MEMS device 104, an electrostatic force causes the spring-suspended capacitor activator 301 to move vane 302 upward raising the position of the gold reflector 303 so that it effectively reflects some or all of the optical signal being emitted from optical fiber 105. The amount of signal reflected is determine by the position of gold reflector 303 relative to the center axis of the optical fiber 105, and the position of gold reflector 303 is dependent on the DC voltage applied to the MEMS device 104. In this fully raised position 305, the gold reflector 303 is shown to cover the central region of optical fiber 105 and thereby maximizes signal reflection. In this maximum reflection position, the signal reflection attenuation is shown in FIG. 2 to be about –3.5 dB for an applied voltage of + or –40 volts. Note again that varying amounts of reflection attenuation in the approximate range –3.5 dB to –16 dB can be set by varying from + or –40 to 0 volts DC, respectively, the amount of bias voltage applied to the MEMS device.

Figure 4:
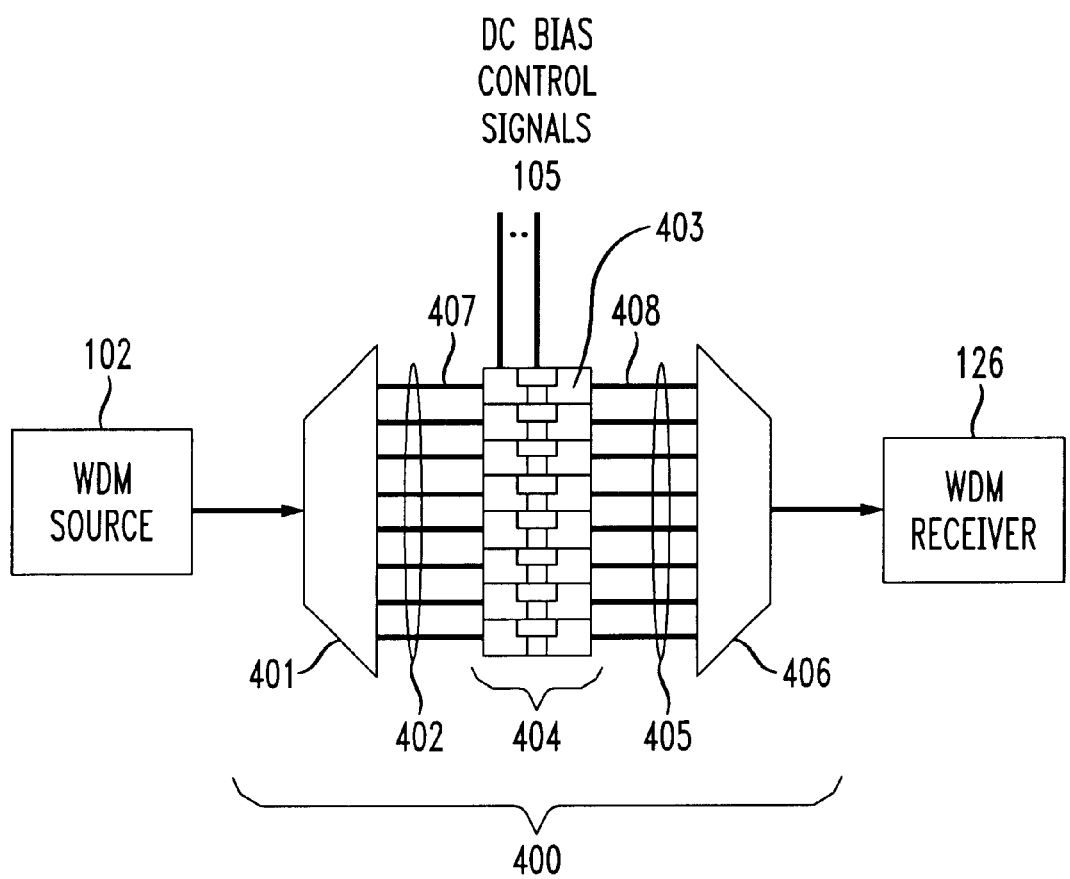
FIG. 4 shows an illustrative channelized WDM gain equalizer which operates in a transmission mode.

With reference to FIG. 4 there is shown an illustrative channelized WDM gain equalizer 400 which operates in a transmission mode. The equalizer 400 embodiment uses two AWG routers (one as a demultiplexer and one multiplexer) and is similar to an add/drop multiplexer [5] and the MEMS devices 403 are used in transmission mode to achieve larger dynamic loss range. As shown, equalizer 400 is implemented using an 8-channel guided-wave demultiplexer 401 with each of its eight outputs connected via optical fibers 402 to interface with a different MEMS device 404. Optical fibers 405 interface the MEMS devices 404 to guided-wave multiplexer 406. Each of the optical fibers 402 align axially with the optical fibers 405 and are separated only by the gap needed for th MEMS devices 404. Each of the MEMS attenuator devices, e.g. 403, are positioned so that their gold reflectors can be raised and lowered in the gap between respective ones of the optical fibers, e.g., 407 and 408.

The operation of FIG. 4 is similar to that of FIG. 1 except that optical signal loss is now directly proportional to bias DC voltage rather than being inversely proportional to the bias DC voltage, as is the case in FIG. 1. With reference to MEMS device 403, this is because with no bias DC voltage applied to MEMS device 403, the position of its gold reflector (see 304 of FIG. 3) does not block the optical signal emitted from optical fiber 407 from reaching optical fiber 408. With reference to FIG. 2, in this inactive or unbiased zero DC volt condition transmission loss is minimal, about 0 dB. As DC bias voltage is applied the MEMS device the arm or the vane raises the gold reflector to block (reflect) some or all of the signal emitted from fiber 407 from reaching fiber 408. Depending on the applied DC voltage the amount of optical signal transmission attenuation can be controlled between the fibers 407 and 408. When the gold reflector is in position to cover the central core area of the fiber 407 maximum signal blocking (reflection) results and hence maximum transmission attenuation to fiber 408 is produced, about 36 dB as shown. The end faces of fibers 407 and 408 are antireflective coated to limit unwanted back reflections and ripple in the transmission. In another embodiment, an optical absorption material can be substituted for the gold reflector 303 of FIG. 3 used to attenuate the optical signal.

The optical signal channels received in fibers 404 are then combined into a WDM signal by multiplexer 406. By individually setting the attenuation of each transmission channel, using the associated MEMS device 404, the WDM signal transmission can be effectively equalized and/or any desired WDM channel transmission characteristic obtained.

Figure 5A:
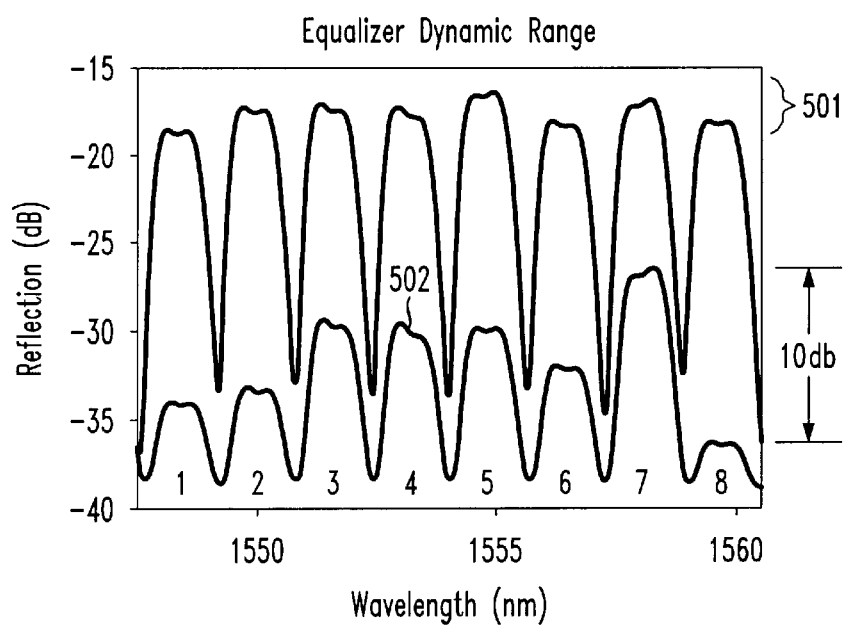
FIGS. 5a and 5b illustratively show, respectively, the dynamic range and the positive and negative slope compensation for the reflective equalizer of FIG. 1.

FIG. 5a illustratively shows the dynamic equalization range for the reflective equalizer 100 of FIG. 1. The tested gain equalizer 100 comprised of a three-port optical circulator 131, an 8-channel 200-GHz spaced arrayed-waveguide grating router 101 (7–8 dB one-pass insertion loss) and 8 MEMS reflective attenuators 102; all were fiber connectorized. Input signals are demultiplexed by the router 101, individually reflected by the attenuators then recombined again and exited through the circulator's third port. The dynamic range is limited by weak reflections from fiber end faces. Better antireflective coatings or angle-polished fiber end faces would improve the dynamic range.

FIG. 5a shows the 8-channel reflective equalizer 100 spectra with all the attenuators set for minimum 501 and maximum 502 values. The minimum equalizer insertion loss 501 including circulator 131, MEMS attenuators 102 and router 101, varied from 16.5 to 18 dB and the dynamic range from 10 dB (channel 7) to 19 dB (channel 8). Replacing the flatband-response router demultiplexer 101 with a lowerloss gaussian passband device could lower the insertion loss to about 9 dB.

Figure 5B:
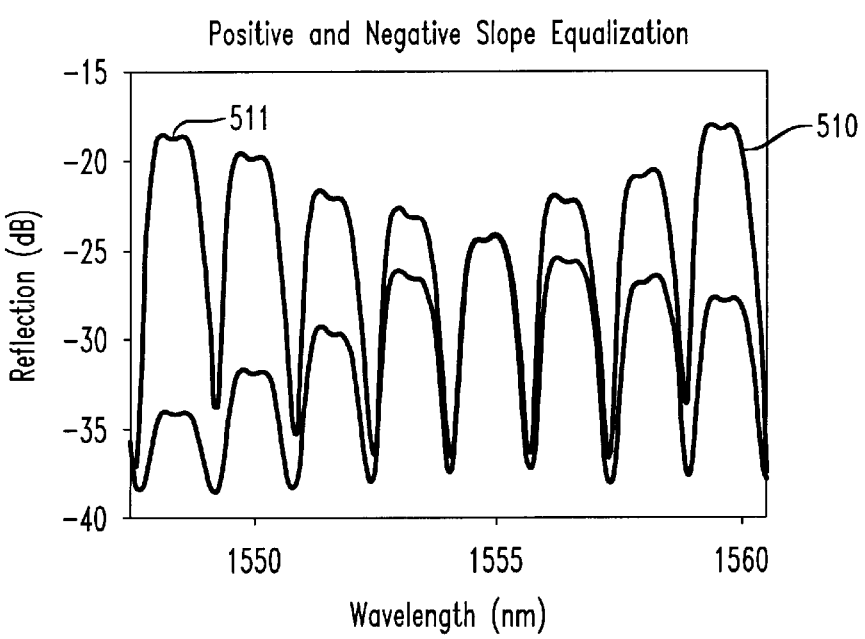
Figure 6A:
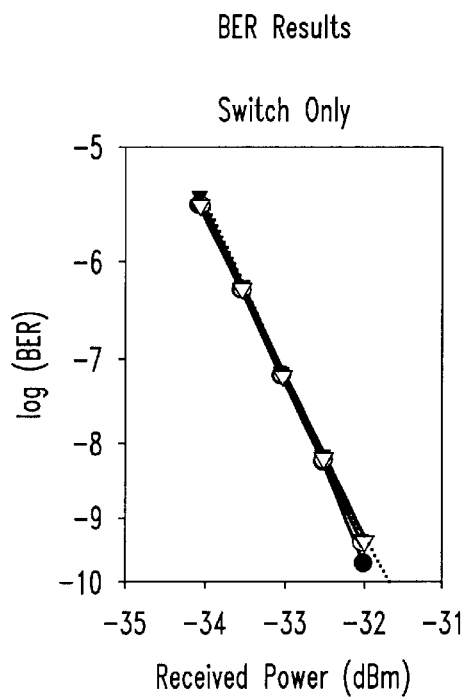
FIGS. 6a through 6d show illustrative bit error rates (BER) versus received power levels for the reflective equalizer of FIG. 1.
Figure 6B:
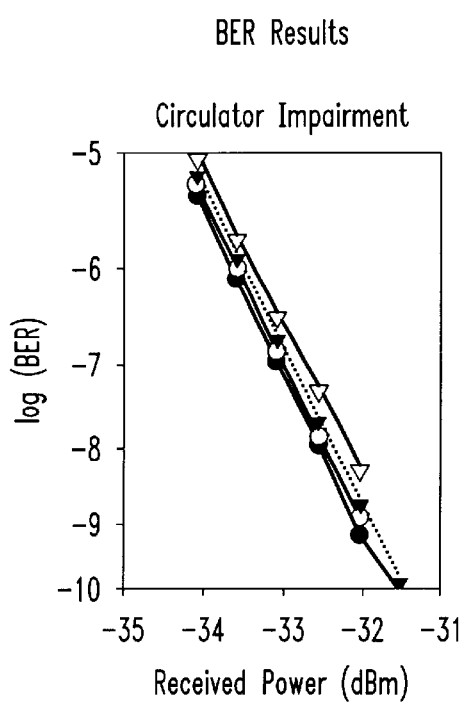
Figure 6C:
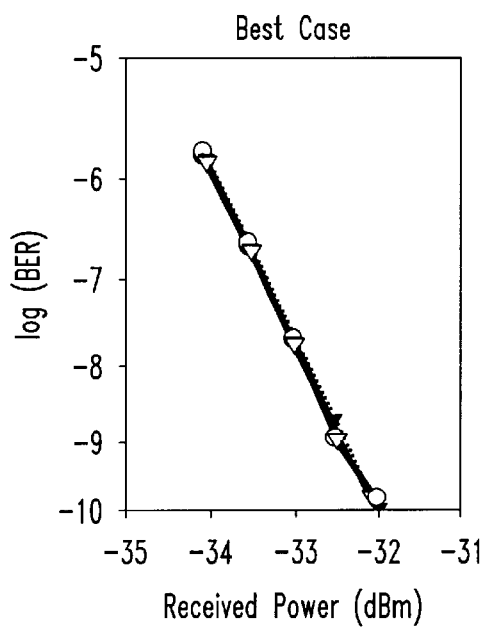
Figure 6D:
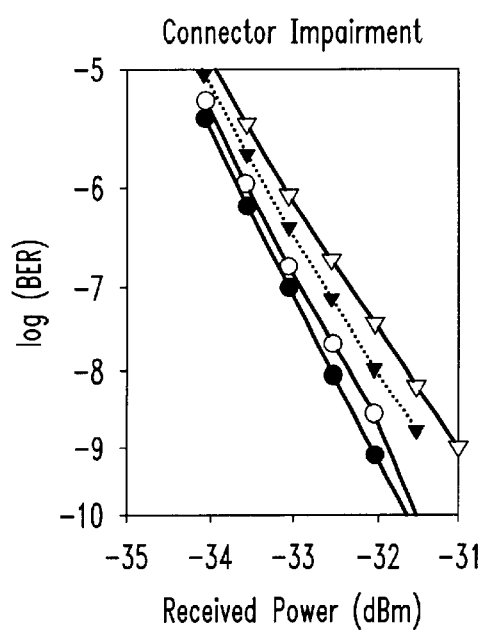

FIG. 5b illustratively shows the positive 510 and negative 511 linear slope equalization capability of:the equalizer 100.

In FIGS. 6a through 6d, equalizer 100 performance is demonstrated using bit error rate (BER) measurements versus received power levels. The test signal utilized was OC-48 rate optical signals generated by a test data source (pattern generator 112 and laser 111). The equalizer was tested with OC-48 optical signals and shown to have negligible impact on BER performance for all operating conditions and no cross-channel interference. It was, however, necessary to avoid weak reflections, >−40 dB, between the router input and the circulator in order to prevent coherent interference on the equalized channels. For the same reason, high isolation between circulator ports 1 and 3 was needed. To show this, measurements on channel 2 were taken with 4 attenuation settings (0, 3, 6 and 9 dB) first with a connector reflection between the circulator and router limiting the signal-to-crosstalk ratio to <26 dB, thereby causing bit error-rate degradation. The connector was replaced with a fusion splice, leaving the equalizer degrading signals by light leakage (−36 dB) through the circulator and limiting the signal-to-crosstalk to <28.5 dB. Replacing the circulator with one having 5 dB higher isolation eliminated the crosstalk impairment and the equalizer then performed as well as a single reflective attenuator.

The above results illustrated a channelized WDM equalizers using MEMS reflective attenuators, achieving −17 dB insertion loss for a flatband channel response and 10 dB dynamic range in the 1550 nm wavelength region.

What has been described is merely illustrative of the application of the principles of the present invention. Other methods and arrangements can be implemented by those skilled in the art without departing from the spirit and scope of the present invention.

REFERENCES

[1] C. R. Giles and D. J. DiGiovanni, "Dynamic gain equalization in two-stage fiber amplifiers," IEEE Photonics Technology Letters, vol.2, no-12, pp 866–868, 1990.

[2] J. A. Walker, J. E. Ford, and K. W. Goossen, "Demonstration of a Gain Flattened Optical Amplifier with a Micromechanical Equalizer Element", Solid-state Sensor and Actuator Workshop—late news session, Hilton Head, S.C., June 8–11, 1998, pp. 13–15.

[3] J. E. Ford and J. A. Walker, "Dynamic Spectral Power Equalization using Microopto-Mechanics," accepted for publication in Phot. Tech. Lett.

[4] V. Aksyuk, B. Barber, C. R. Giles, R. Ruei, L. Stulz, and D. Bishop, "Low insertion loss packaged and fibre connectorised MEMS reflective optical switch," published in Electron. Lett.

[5] C. R. Giles, B. Barber, V. Aksyuk, R. Ruel, L. Stulz, and D. Bishop, "Reconfigurable 16-channel WDM DROP module using silicon MEMS optical switches," published in Photon. Tech. Left, Vol. 11, No. 1, Jan 1999.

What is claimed is:

1. A wavelength division multiplex (WDM) signal equalizer comprising a WDM signal guided-wave demultiplexer apparatus for receiving an input WDM optical signal and demultiplexing it into a plurality of optical signal channels for output at different output ports of the demultiplexer apparatus, a plurality of independently controllable microelectromechanical system (MEMS) devices, each MEMS device aligned with a different optical channel output port of the demultiplexer apparatus for adjustably controlling a signal level coupled from that optical channel output port of the WDM multiplexer apparatus to an optical apparatus in response to a control signal to that MEMS device, and wherein said WDM demultiplexer apparatus includes a WDM demultiplexer and a plurality of optical fibers having a first end connected to the outputs of the WDM demultiplexer and a second end forming the output ports of the WDM apparatus.

2. A wavelength division multiplex (WDM) signal equalizer comprising a WDM signal guided-wave demultiplexer apparatus for receiving an input WDM optical signal and demultiplexing it into a plurality of optical signal channels for output at different output ports of the demultiplexer apparatus, a plurality of independently controllable microelectromechanical system (MEMS) devices, each MEMS device aligned with a different optical channel output port of the demultiplexer apparatus for adjustably controlling a signal level coupled from that optical channel output port of the WDM multiplexer apparatus to an optical apparatus in response to a control signal to that MEMS device, and wherein said optical apparatus is the WDM demultiplexer apparatus which combines the reflected adjusted optical signals into an equalized WDM signal and wherein each MEMS device adjust the signal level by adjusting the reflectivity of the MEMS device under control of said control signal, and wherein each MEMS device is aligned so as to adjustably reflect an optical channel output port signal back to that optical channel output port.

3. The WDM signal equalizer of claim 2 further comprising a circulator including an input port for receiving the input WDM optical signal, an output port for outputting the equalized WDM signal, and a third port for coupling the input WDM optical signals to and the equalized WDM signal from the demultiplexer apparatus.

4. The WDM signal equalizer of claim 1 wherein said another apparatus is a WDM multiplexer apparatus including a plurality of input ports for receiving the adjusted optical channel signals from the MEMS devices and for multiplexing them together into a WDM signal and wherein said MEMS devices are located between the output ports of the WDM demultiplexer apparatus and the input ports of the WDM multiplexer apparatus.

5. The WDM signal equalizer of claim 1 wherein said WDM multiplexer apparatus includes a WDM demultiplexer and a plurality of optical fibers having a first end forming the input ports of the WDM multiplexer apparatus and a second end connected to the inputs of the WDM multiplexer.

6. The WDM signal equalizer of claim 5 wherein each MEMS device includes a reflective element and wherein the reflectivity is controlled by moving the reflective element across the front of an optical channel output port.

7. The WDM signal equalizer of claim 6 wherein each MEMS device includes a spring suspended capacitor actuated arm to position the reflective element.

8. The WDM signal equalizer of claim 4 wherein each MEMS device includes a attenuation element and wherein the attenuation is controlled by moving the attenuation element across the front of an optical channel output port.

9. The WDM signal equalizer of claim 1 wherein each MEMS device includes a spring suspended capacitor actuated arm to position a reflector in front of an optical channel output port to adjust signal levels.

10. The WDM signal equalizer of claim 1 wherein the guided-wave WDM signal demultiplexer is an arrayed wavelength router (AWR).

11. The WDM signal equalizer of claim 1 wherein the guided-wave WDM signal demultiplexer is a gaussian passband device.

* * * * *